US009102196B2

(12) United States Patent
Sanaka et al.

(10) Patent No.: US 9,102,196 B2
(45) Date of Patent: Aug. 11, 2015

(54) WHEEL BEARING APPARATUS FOR A VEHICLE

(71) Applicant: NTN Corporation, Osaka-shi (JP)

(72) Inventors: Junichi Sanaka, Iwata (JP); Tadashi Mitsuishi, Iwata (JP)

(73) Assignee: NTN Corporation, Osaka-shi (JP)

(*) Notice: Subject to any disclaimer, the term of this patent is extended or adjusted under 35 U.S.C. 154(b) by 0 days.

(21) Appl. No.: 14/039,031

(22) Filed: Sep. 27, 2013

(65) Prior Publication Data

US 2014/0029883 A1 Jan. 30, 2014

Related U.S. Application Data

(63) Continuation of application No. PCT/JP2012/058347, filed on Mar. 29, 2012.

(30) Foreign Application Priority Data

Mar. 30, 2011 (JP) ................................ 2011-076006

(51) Int. Cl.

| | |
|---|---|
| ***F16C 13/00*** | (2006.01) |
| ***F16C 19/02*** | (2006.01) |
| ***F16C 33/76*** | (2006.01) |
| ***B60B 27/00*** | (2006.01) |
| ***F16J 15/32*** | (2006.01) |
| ***F16C 33/78*** | (2006.01) |
| ***F16C 35/067*** | (2006.01) |
| *F16C 41/00* | (2006.01) |
| *F16C 19/18* | (2006.01) |

(52) U.S. Cl.

CPC .......... *B60B 27/0073* (2013.01); *F16C 33/768* (2013.01); *F16C 33/783* (2013.01); *F16C 33/7883* (2013.01); *F16C 35/067* (2013.01); *F16J 15/3264* (2013.01); *F16C 19/186* (2013.01); *F16C 41/007* (2013.01)

(58) Field of Classification Search

CPC ............ F16C 33/7823; F16C 33/7866; F16C 33/7876; F16C 33/7883

USPC .......... 384/477, 478, 480, 484–486, 544, 589

See application file for complete search history.

(56) References Cited

U.S. PATENT DOCUMENTS

| | | | |
|---|---|---|---|
| 2009/0263063 | A1 | 10/2009 | Komori |
| 2010/0232734 | A1 | 9/2010 | Torii et al. |
| 2011/0069917 | A1 | 3/2011 | Yamada et al. |

FOREIGN PATENT DOCUMENTS

| | | |
|---|---|---|
| DE | 102008017409 | 10/2009 |
| JP | 5-61567 | 8/1993 |

(Continued)

*Primary Examiner* — Phillip A Johnson

(74) *Attorney, Agent, or Firm* — Harness, Dickey & Pierce, P.L.C.

(57) ABSTRACT

A vehicle wheel bearing apparatus has an inner-side seal with an annular slinger and a sealing plate. The slinger has a cylindrical portion and a standing portion. The sealing plate has a metal core and a sealing member. The metal core is press-fit into the inner circumference of an end of the outer member. The sealing member has a pair of side lips that angularly extend radially outward. The sealing member is adapted to be in sliding contact with the standing portion of the slinger, via a predetermined axial interface. The sealing member is secured to the metal core while extending over the outer circumference of an end of the metal core. The sealing member is formed with an outer circumferential lip extending radially outward from its circumferential end. The lip has a substantially L-shaped longitudinal section and is adapted to be fit in a gap between the inner-side end of the outer member and a flange portion of the knuckle.

14 Claims, 8 Drawing Sheets

Outer side
Inner side
5
4
10
10a
10a
17
9
8
2
3
1
2a
3a
2b
2c
6
7
10b

(56) References Cited

FOREIGN PATENT DOCUMENTS

| | | | |
|---|---|---|---|
| JP | 2003-056579 | | 2/2003 |
| JP | 2007-285500 | | 11/2007 |
| JP | 2008019988 | A * | 1/2008 |
| JP | 2009-127790 | | 6/2009 |
| JP | 2010-121645 | | 6/2010 |
| JP | 2010-230059 | | 10/2010 |
| WO | WO2008/081586 | | 7/2008 |
| WO | WO2009/144785 | | 12/2009 |

* cited by examiner 17
17a
17b
17c
α
β
γ
θ
11
13
13a
13b
14
14a
14b
14c
12
19
(a)
α=β=γ
10
16
15
β'
γ'
C
B
H
9
(b)
θ≧10°
H/B=1.2~1.8
L
(c)
L≧1.35

(a)

(b)

(a)

(b)

WHEEL BEARING APPARATUS FOR A VEHICLE

CROSS-REFERENCE TO RELATED APPLICATIONS

This application is a continuation of International Application No. PCT/JP2012/058347, filed Mar. 29, 2012, which claims priority to Japanese Application No. 2011-076006 filed Mar. 30, 2011. The disclosures of the above applications are incorporating herein by reference.

FIELD

The present disclosure relates to a vehicle wheel bearing apparatus that rotatably supports a wheel of a vehicle and, more particularly, to a vehicle wheel bearing apparatus that can prevent the generation of corrosion by improving the sealability between an outer member of the bearing and a knuckle and ensures the sealing property of a seal for a long term while improving muddy water resistance of the seal.

BACKGROUND

In general, wheel bearing apparatus that can rotationally support a wheel hub for mounting a wheel, via double row rolling bearings, is classified for a driving wheel and a driven wheel. For structural reasons, the wheel bearing apparatus of an inner ring rotation type is used for the driving wheel. Both the inner ring rotation type and outer ring rotation type are used for the driven wheel. In general, the wheel bearing apparatus is classified as a so-called first through fourth generation type. In the first generation type, the wheel bearing has double row angular-contact ball bearings fit between the knuckle and the wheel hub. In the second generation type, a body mounting flange or a wheel mounting flange is integrally formed on the outer circumference of an outer member. In the third generation type, one of inner raceway surfaces is directly formed on the outer circumference of a wheel hub. In the fourth generation type, the inner raceway surfaces are directly formed on the outer circumferences, respectively, of the wheel hub and the outer joint member of a constant velocity universal joint.

The wheel bearing apparatus is provided with seals to prevent leakage of grease contained within the bearing apparatus and entry of rain water or dust from the outside of the bearing apparatus. Recently, there is a desire for the bearing apparatus to have a long durability and be maintenance free during the life of an automobile. Under these circumstances, it has been found that many causes of trouble are based on bearing seals due to entry of rain water or dust into the bearing rather than peeling or breakage of structural elements of the bearings. Accordingly, it is very important to improve the sealability of the bearing apparatus in order to extend its life.

Several seals improvements have been proposed with increased sealability and one example of the seals of the prior art is shown in FIG. 8. This seal 50 is mounted in one opening of an annular space formed between ends of an outer member and an inner ring. The seal 50 has an annular slinger 51 and an annular sealing plate 52 arranged opposite to each other. The slinger 51 is press-formed from steel sheet with a substantially L-shaped longitudinal section. It has a cylindrical portion 51*a*, press-fit onto the inner member (inner ring, not shown), and a standing portion 51*b* extending radially outward from the cylindrical portion 51*a.*

The sealing plate 52 has a substantially L-shaped longitudinal section. It includes a metal core 53 and a sealing member 54. The metal core 53 is press-fit into the outer member (not shown). The sealing member 54 is adhered to the metal core 53, via vulcanizing adhesion. The sealing member 54 is formed of elastic material and includes a pair of side lips 54*a*, 54*b* and a grease lip 54*c*. The side lips 54*a*, 54*b* are in sliding contact with the standing portion 51*b* of the slinger 51. The grease lip 54*c* is in sliding contact with the cylindrical portion 51*a* of the slinger 51. The side lips 54*a*, 54*b* radially extend angularly outward and their tip ends are in sliding contact with the standing portion 51*b* of the slinger 51, via a predetermined interference. In addition, a magnetic encoder 55 is integrally adhered to the side surface of the standing portion 51*b* of the slinger Si, via vulcanizing adhesion.

In this case, if a distance C between the pair of side lips 54*a*, 54*b* is set to 0.1 mm or more, the sectional height H of the seal 50 could be reduced to about 6 mm without detracting from the muddy water resistance. Thus, the weight and size of the wheel bearing can also be reduced (e.g., see JP2009-127790A).

High performance can be achieved against muddy water entering into the inside of a wheel bearing by such a prior art seal 50. However, it is difficult to have high performance against muddy water under severe circumstances where the fitting portions, between the seal 50 and the outer member as well as between the outer member and the knuckle where the outer member is fit and directly exposed to the muddy water.

The seal 56 shown in FIG. 9 improves sealability between an outer member 58 and a knuckle 66. Similar to the seal 50 described above, this seal also includes an annular slinger 59 and a sealing plate 60 arranged opposite to each other. They are mounted onto an inner ring 57 and the outer member 58, respectively, to seal the annular space between the inner ring 57 and the outer member 58.

The slinger 59 is press-formed from a steel sheet and includes a cylindrical portion 59*a* and a standing portion 59*b*. The cylindrical portion 59*a* is press-fit onto the outer circumference of the inner ring 57. The standing portion 59*b* extends radially outward from the cylindrical portion 59*a*. A magnetic encoder 61, formed from rubber magnet, is integrally adhered to the side surface of the standing portion 59*b* of the slinger 59, via vulcanizing adhesion. The magnetic encoder 61 is magnetized with N and S poles alternately arranged along its circumference. The magnetic encoder 61 forms a rotary encoder to detect the rotation speed of a wheel.

The sealing plate 60 is press-formed from a steel sheet. It has a metal core 62 and a sealing member 63. The metal core 62 is press-fit into the outer member 58. The sealing member 63 is adhered to the metal core 62, via vulcanizing adhesion. The sealing member 63 is formed of elastic material, such as rubber or synthetic resin. The sealing member 63 has a side lip 63*a* and a pair of radial lips 63*b*, 63*c*. The radial lips 63*b*, 63*c* are in sliding contact with the cylindrical portion 59*a* of the slinger 59. The standing portion 59*b* of the slinger 59 opposes the outer circumference of the sealing member 63 via a slight radial gap and forms a labyrinth seal 64.

In addition, an edge portion of the outer circumferential end of the sealing member 63 is formed with a radially outward extending outer circumferential lip 65. The outer circumferential lip 65 has a L-shaped longitudinal section and is adapted to be fit in a gap "e" between the outer member 58 and the knuckle 66. Thus, it is possible to seal the gap "e" and prevent muddy water, etc. from entering into the gap "e". Accordingly, the generation of corrosion on the outer member 58 and knuckle 66 is prevented (e.g. see JP2003-56579A).

However, in such a prior art seal 56, the outer circumferential lip 65 cannot surely contact with the knuckle 66 and the outer member 58 at two points, i.e., at the lip apex 65*a* and the tip end 65*b*, if the bent angle of the tip end portion 65*b* is not properly set. That is, if the bent angle of the tip end portion 65*b* is not properly set, the outer circumferential lip 65 would be curled and thus collapse between the end face of the outer member 58 and the knuckle 66. This would cause an unsealed gap between the outer member 58 and the knuckle 66. Thus, the reliable sealability cannot be achieved.

SUMMARY

It is therefore an object of the present disclosure to provide a wheel bearing apparatus that can prevent the generation of corrosion by improving the sealability between the outer member and the knuckle. Also, it ensures sealing properties for a long term with improved resistance against muddy water.

It is an object of the present disclosure to provide a vehicle wheel bearing apparatus that comprises an outer member to be fit into a knuckle which forms a suspension apparatus of the vehicle. The outer member inner circumference includes double row outer raceway surfaces. An inner member is formed, on its outer circumference, with inner raceway surfaces that oppose, respectively, one of the double row outer raceway surfaces. Double row rolling elements are freely rollably contained between the inner raceway surfaces and the outer raceway surfaces of the inner member and the outer member. Seals are mounted within annular openings formed between the outer member and the inner member. The inner-side seal of the seals comprises an annular slinger and a sealing plate. The slinger includes a cylindrical portion and a standing portion. The cylindrical portion is press-fit onto the inner member. The standing portion extends radially outward from the cylindrical portion. The sealing plate includes a metal core and a sealing member. The metal core is press-fit into the inner circumference of the end of the outer member. The sealing member is integrally adhered to the metal core, via vulcanizing adhesion. The sealing member has a pair of side lips that angularly extend radially outward. The side lips are adapted to be in sliding contact with the standing portion of the slinger, via a predetermined axial interface. The sealing member is secured to the metal core while extending over the outer circumference of the end of the metal core. The sealing member is formed with an outer circumferential lip extending radially outward from its circumferential end. The sealing member has a substantially L-shaped longitudinal section and is adapted to fit in a gap between the inner-side end of the outer member and a flange portion of the knuckle.

The vehicle wheel bearing apparatus has the inner-side seal of the seals comprising an annular slinger and a sealing plate. The slinger includes a cylindrical portion and a standing portion. The cylindrical portion is press-fit onto the inner member. The standing portion extends radially outward from the cylindrical portion. The sealing plate includes a metal core and a sealing member. The metal core is press-fit into the inner circumference of the end of the outer member. The sealing member is integrally adhered to the metal core via vulcanizing adhesion. The sealing member has a pair of side lips that angularly extends radially outward. The side lips are adapted to be in sliding contact with the standing portion of the slinger, via a predetermined axial interface. The sealing member is secured to the metal core while extending over the outer circumference of the end of the metal core. The sealing member is formed with an outer circumferential lip that extends radially outward from its circumferential end. The sealing member has a substantially L-shaped longitudinal section. The sealing member is adapted to fit in a gap between the inner-side end of the outer member and a flange portion of the knuckle. Thus, it is possible to ensure sealing properties for a long term with improved resistance against muddy water. Also, it is possible to prevent entry of muddy water into the gap between the outer member and the knuckle by preventing the outer circumferential lip from being damaged. Further, it is possible to prevent the generation of corrosion while improving the sealability between the outer member and knuckle.

The radially outer-side side lip of the side lips is arranged so that a gap remains relative to the outermost circumference of the radially inner-side lip even if the radially outer-side lip has been worn out. Also, there is no interference relative to the standing portion of the slinger. This makes it possible to prevent the radially outer-side lip from contacting with the radially inner-side lip even if the radially outer-side lip has been worn out. Accordingly, this keeps a preferable sliding contact condition of the radially inner-side lip to improve the resistance of the seal against muddy water. In general, interference of the radially outer-side lip is the same or more as that of the radially inner-side lip.

If the sealing member is further formed with a grease lip, that angularly extends toward the inside of the bearing at a position radially inside of the side lips, it is possible to prevent leakage of grease.

In a condition prior to assembly of the sealing plate to the slinger, an inclined angle of the outer circumferential lip and inclined angles of the pair of side lips, relative to the axis of the bearing, are substantially identical. This makes it possible to improve the drafting ability during molding of the sealing member.

The sealing member is integrally formed with a tongue axially extending from the side surface of the metal core to the outer-side direction. Thus, it is possible to prevent the outer circumferential lip from contacting with the metal core when the seals are stacked upon each other in an assembling line of the wheel bearing. Thus, this prevents the sealing lip from being damaged. In addition, if a magnetic encoder contacts an adjacent metal core, the magnetic encoder would be closely adhered to the metal core. Thus, seals cannot be easily separated from each other. The provision of the tongue can solve such a problem and improve the workability during assembly of the seal to the wheel bearing.

The sealing member is further formed with an auxiliary lip that angularly extends radially outward at a position radially outside of the side lips. The auxiliary lip is arranged opposite to the outer side surface of the standing portion of the slinger, via a predetermined axial gap. Thus, it is possible to prevent the radially outer side lip from being directly exposed to muddy water that would enter into the seal from the outside. Thus, this improves both the muddy water resistance and the durability of the seal.

A bent angle of the tip end portion of the outer circumferential lip is 10° or more relative to a line normal to the end face of the outer member. The tip end portion and the lip apex of the outer circumferential lip elastically contact, via appropriate interferences, with two points, respectively, with the end face of the outer member and a flange of the knuckle after assembly of the wheel bearing apparatus to the knuckle. Thus, it is possible to ensure the sealing property for a long term while improving the muddy water resistance. Also, it possible to prevent entry of muddy water into the gap between the outer member and the knuckle while preventing the outer circumferential lip from being damaged. Further, it is possible to prevent the generation of corrosion while improving the sealability between the outer member and knuckle.

A flat face portion is formed on the outer circumferential lip at the base. The height of the flat face portion is 1.35 mm or more. Thus, it is possible to improve the workability during press-fitting and to prevent the outer circumferential lip from being damaged.

Oil material is previously applied on the outer circumferential lip. The lip apex is in contact with the flange of the knuckle within a margin area for contact. Thus, it is possible to improve the sealability of the seal and to prevent the bulging out of the outer circumferential lip from the knuckle.

A magnetic encoder is formed from an elastomer mingled with magnetic powder. N and S poles are alternately arranged along its circumference. The encoder is integrally adhered, via vulcanizing adhesion, on the inner-side surface of the standing portion of the slinger. The magnetic encoder is integrally formed, on its outer circumference, with a shielding lip. The shielding lip angularly extends radially outward. The shielding lip opposes the base of the outer circumferential lip, via slight contact or a slight labyrinth gap. This makes it possible to prevent muddy water from entering into the seal from the outside.

Grease is previously applied to the shielding lip. Thus, it is possible to prevent an extreme increase of torque even when the shielding lip is slightly contacted with the seal during running of the vehicle.

A ratio H/B, a height H of seal longitudinal section from the inner circumference of the slinger to the outer circumference of the sealing plate to a width B of the seal, is set within a range of 1.2~1.8. Thus, it is possible to keep the muddy water resistance and to remarkably reduce the height of the seal section.

The sealing member is formed from a rubber material with the compression set of physical properties of rubber of 40% or less at 120° C.×70 hours and the TR 10 value of −35° C. or less. Thus, it is possible to obtain preferable strain recovering ability even in a low temperature region and thus keep a desirable sealing performance.

The vehicle wheel bearing apparatus of the present disclosure comprises an outer member that fits into a knuckle that forms a suspension apparatus of the vehicle. The outer member inner circumference has double row outer raceway surfaces. An inner member is formed, on its outer circumference, with inner raceway surfaces that oppose, respectively, one of the double row outer raceway surfaces. Double row rolling elements are freely rollably contained between the inner raceway surfaces and the outer raceway surfaces of the inner member and the outer member. Seals are mounted within annular openings formed between the outer member and the inner member. The inner-side seal of the seals includes an annular slinger and a sealing plate. The slinger includes a cylindrical portion and a standing portion. The cylindrical portion is press-fit onto the inner member. The standing portion extends radially outward from the cylindrical portion. The sealing plate has a metal core and a sealing member. The metal core is press-fit into the inner circumference of the end of the outer member. The sealing member is integrally adhered to the metal core via vulcanizing adhesion. The sealing member has a pair of side lips that angularly extend radially outward. The sealing member is adapted to be in sliding contact with the standing portion of the slinger, via a predetermined axial interface. The sealing member is secured to the metal core while extending over the outer circumference of the end of the metal core. The sealing member is formed with an outer circumferential lip that extends radially outward from its circumferential end. The sealing member has a substantially L-shaped longitudinal section. The sealing member is adapted to fit in a gap between the inner-side end of the outer member and a flange portion of the knuckle. Thus, it is possible to ensure sealing properties for a long term while improving muddy water resistance. Also, it is possible to prevent entry of muddy water into the gap between the outer member and the knuckle while preventing the outer circumferential lip from being damaged. Further, it is possible to prevent the generation of corrosion while improving the sealability between the outer member and knuckle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3(*b*) is a partially enlarged view of a seal unit of FIG. 2.

FIG. 3(*c*) is a partially enlarged view of FIG. 3(*b*).

FIG. 4(*b*) is an explanatory view of a condition after assembly of the wheel bearing apparatus into a knuckle.

FIG. 7(*b*) is a partially enlarged view of the seal of FIG. 7(*a*).

DETAILED DESCRIPTION

One mode for carrying out the present disclosure is a vehicle wheel bearing apparatus with an outer member formed with a body mounting flange on its outer circumference. The flange is to be mounted on a knuckle of a vehicle suspension apparatus. The outer member inner circumference includes double row outer raceway surfaces. An inner member includes a wheel hub and an inner ring. The wheel hub is integrally formed, on its one end, with a wheel mounting flange. The wheel hub has a cylindrical portion axially extending from the wheel mounting flange. The inner ring is press-fit onto the cylindrical portion of the wheel hub. The wheel hub and the inner ring include, on their outer circumferences, respectively, double row inner raceway surfaces that oppose the double row outer raceway surface. Double row rolling elements are freely rollably contained, via cages, between the inner raceway surfaces of the inner member and the outer raceway surfaces of the outer member. Seals are mounted within annular openings formed between the outer member and the inner member. The inner-side seal of the seals includes an annular slinger and a sealing plate. The slinger includes a cylindrical portion and a standing portion. The cylindrical portion is press-fit onto the inner member.

The standing portion extends radially outward from the cylindrical portion. The sealing plate includes a metal core and a sealing member. The metal core is press-fit into the inner circumference of the end of the outer member. The sealing member is integrally adhered to the metal core, via vulcanizing adhesion. The sealing member has a pair of side lips that angularly extend radially outward. The sealing member is adapted to be in sliding contact with the standing portion of the slinger, via a predetermined axial interface. The sealing member is secured to the metal core while extending over the outer circumference of the end of the metal core. The sealing member is formed with an outer circumferential lip that extends radially outward from its circumferential end. The sealing member has a substantially L-shaped longitudinal section and is adapted to fit in a gap between the inner-side end of the outer member and a flange portion of the knuckle.

A preferred embodiment of the present disclosure will be hereinafter described with reference to the drawings.

Figure 1:
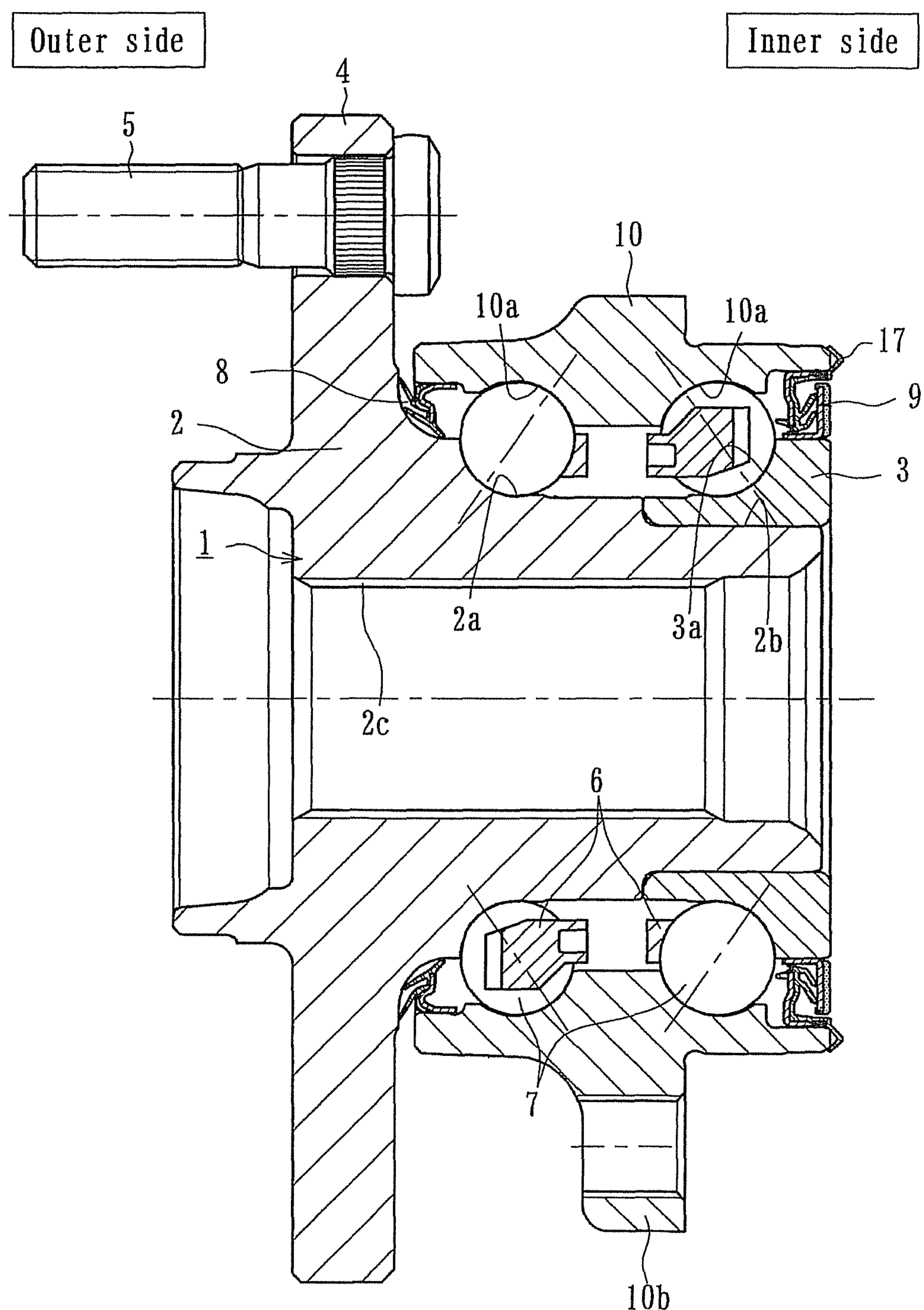
FIG. 1 is a longitudinal section view of one preferred embodiment of the vehicle wheel bearing apparatus.
Figure 2:
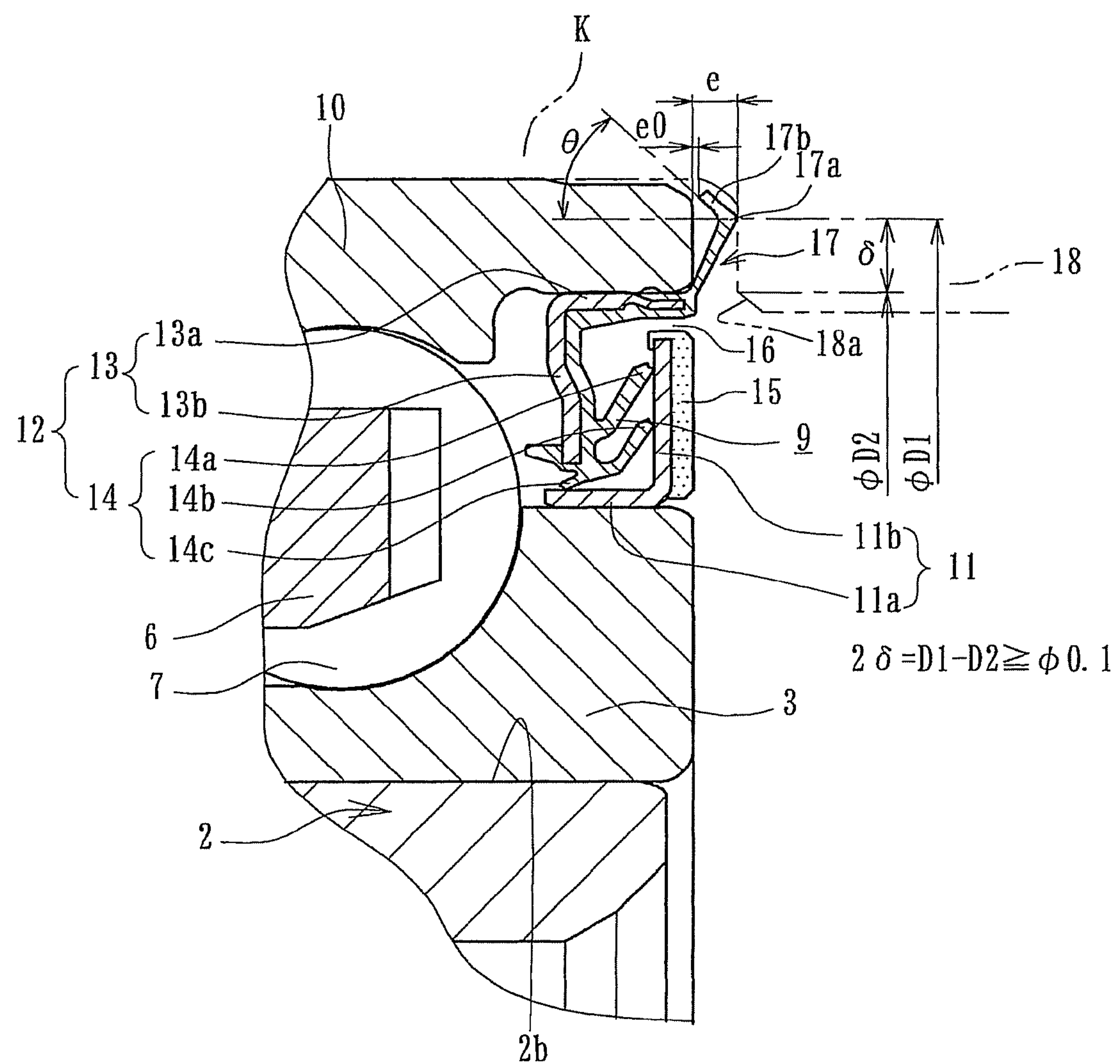
FIG. 2 is a partially enlarged view of the seal of FIG. 1.
Figure 3:
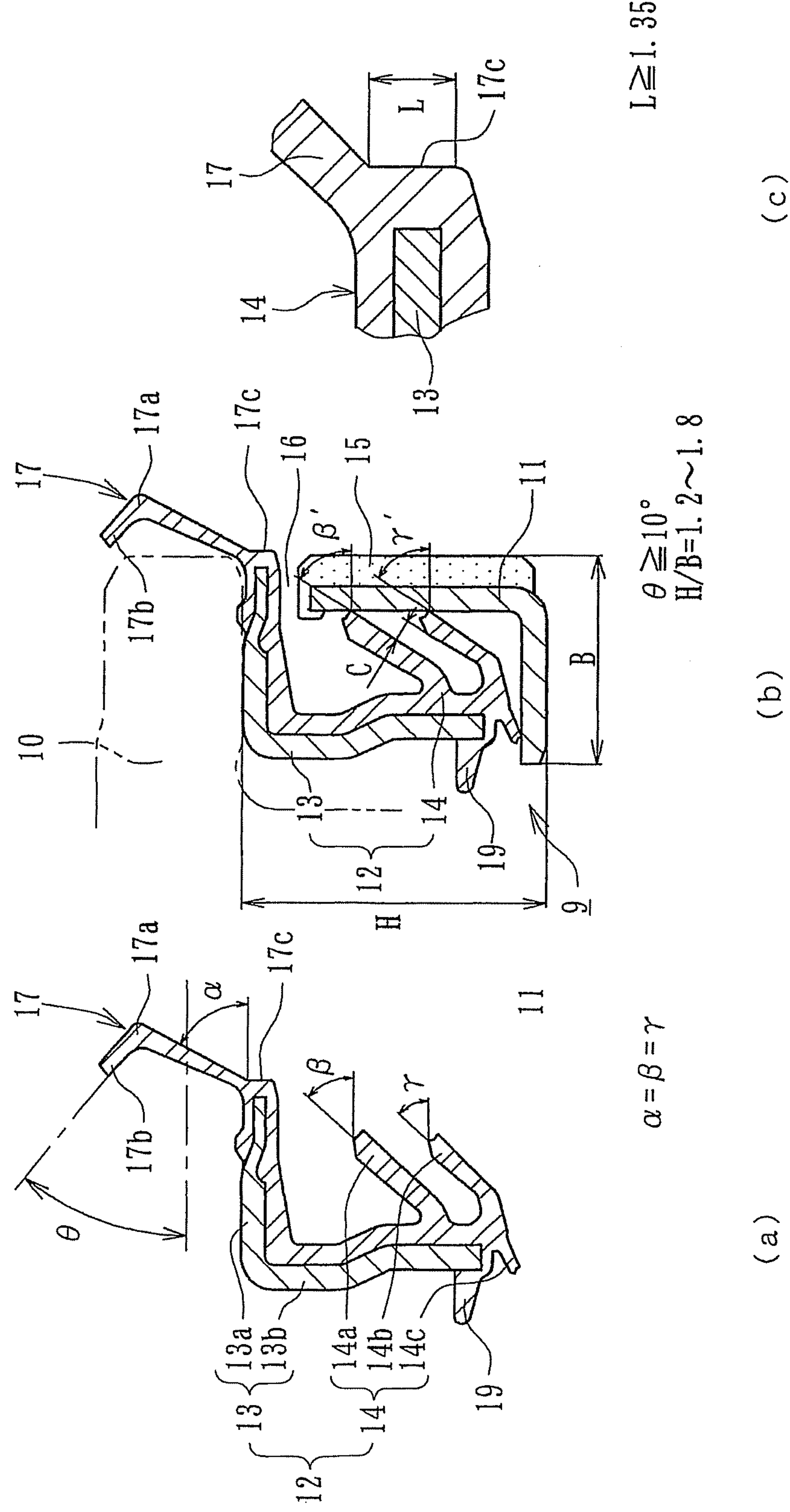
FIG. 3(*a*) is a partially enlarged view of only a sealing plate of FIG. 2.
Figure 4:
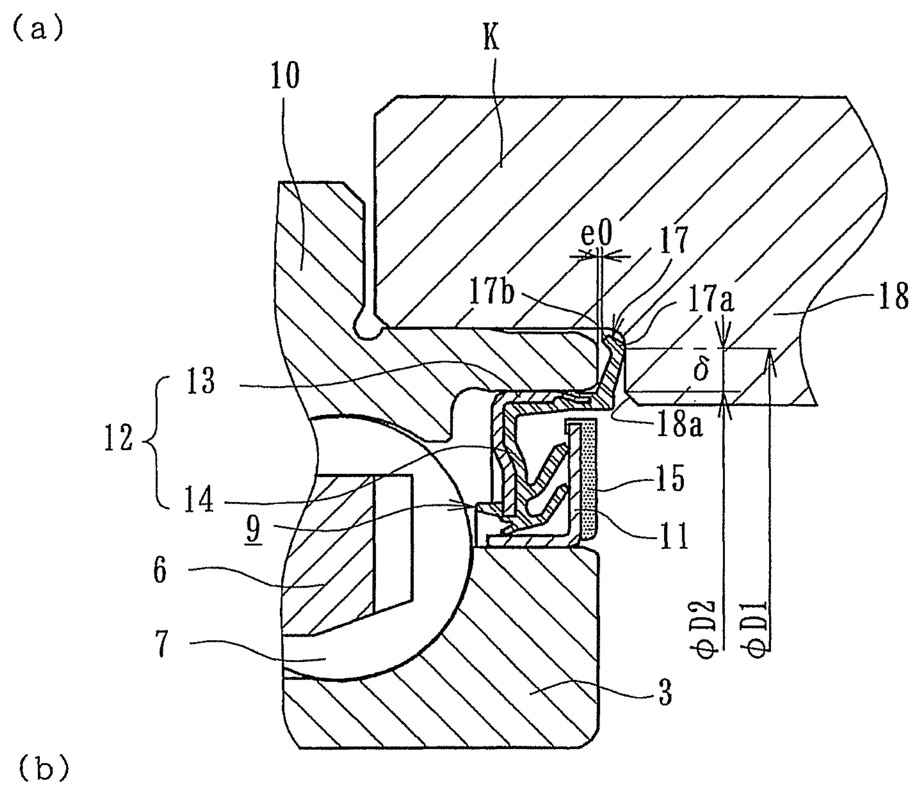
FIG. 4(*a*) is an explanatory view of a condition during assembly of the wheel bearing apparatus to a knuckle.
Figure 4:
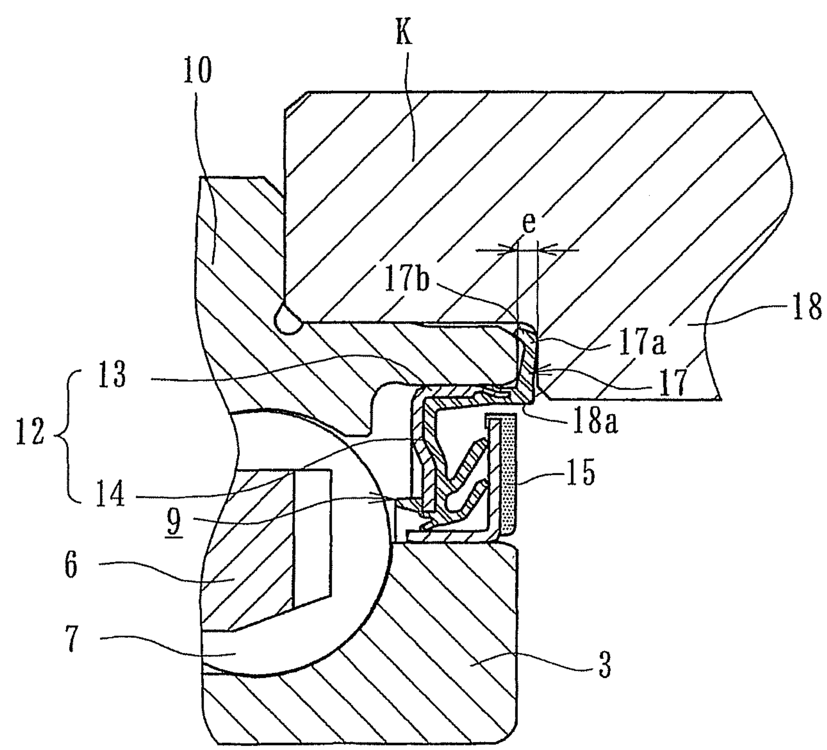
Figure 5:
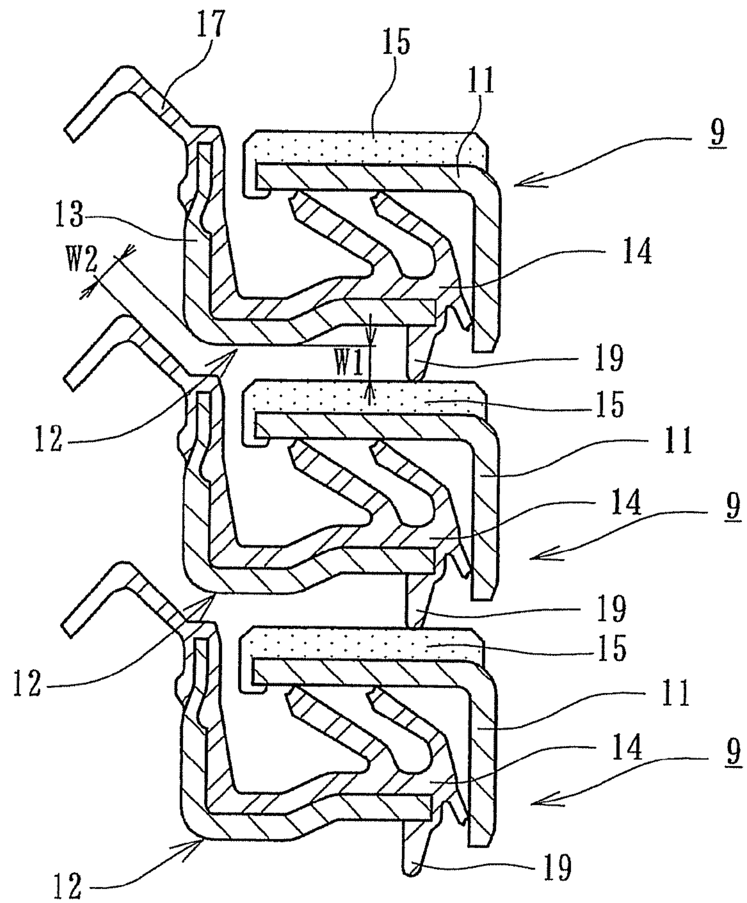
FIG. 5 is an explanatory view of a stacked condition of the seals of the present disclosure.
Figure 6:
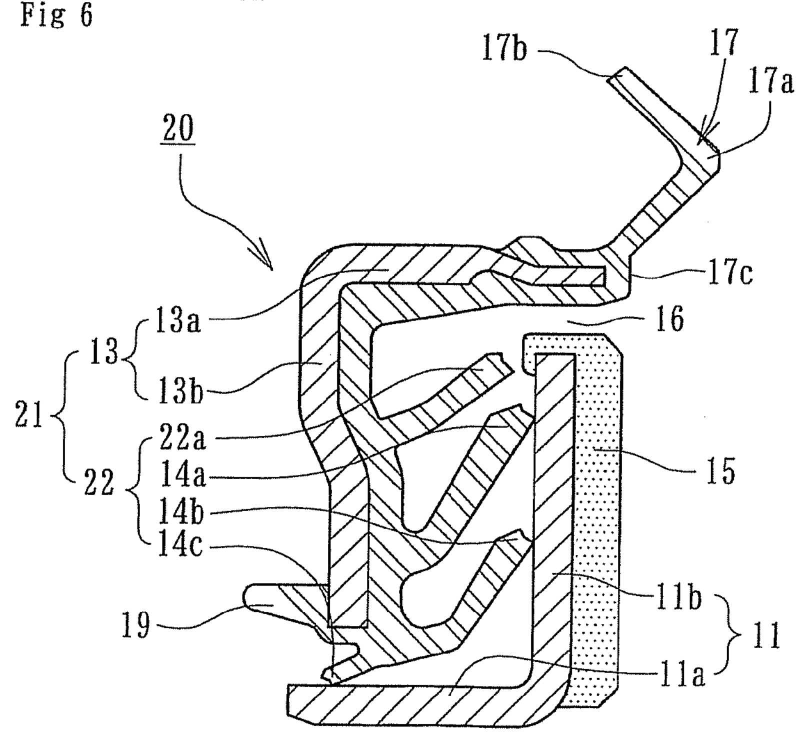
FIG. 6 is a longitudinal section view of a modification of the seal of FIG. 2.
Figure 7:
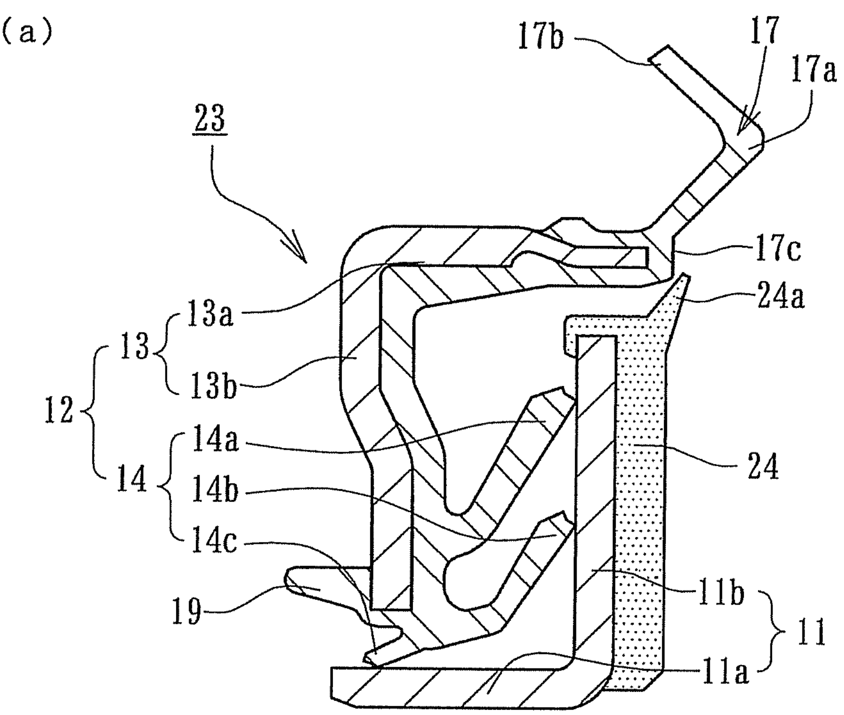
FIG. 7(*a*) is a longitudinal section view of another modification of the seal of FIG. 2.
Figure 7:
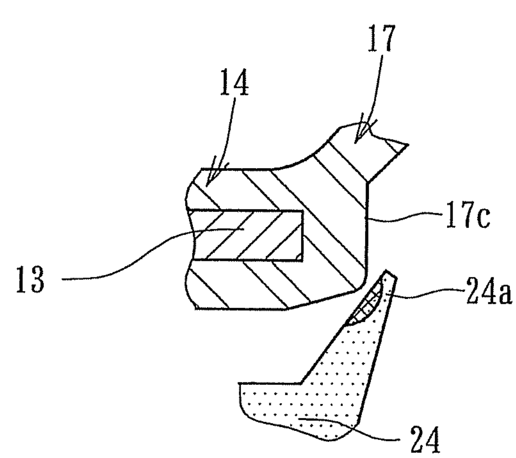
Figure 8:
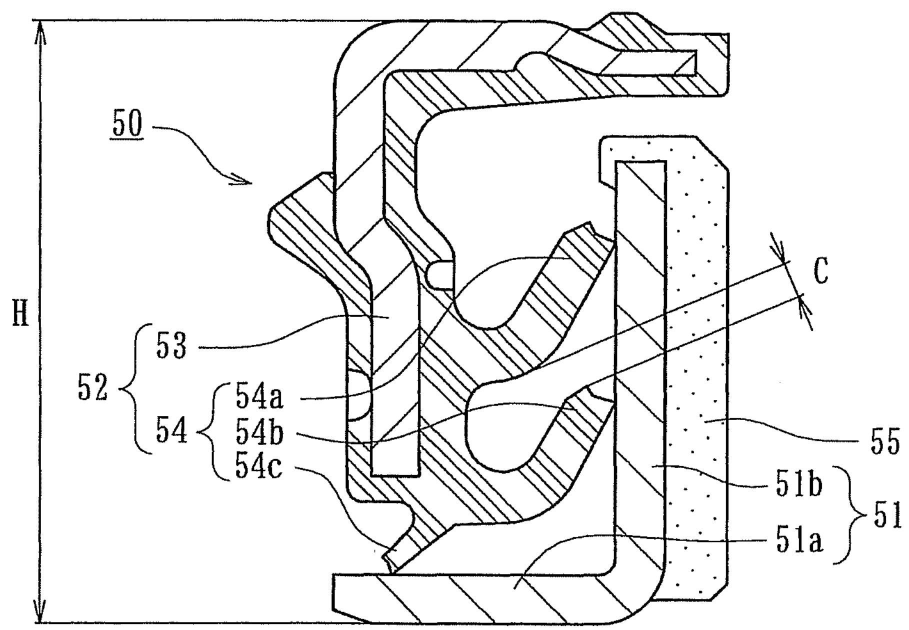
FIG. 8 is a longitudinal section view of a seal unit of a prior art wheel bearing apparatus.
Figure 9:
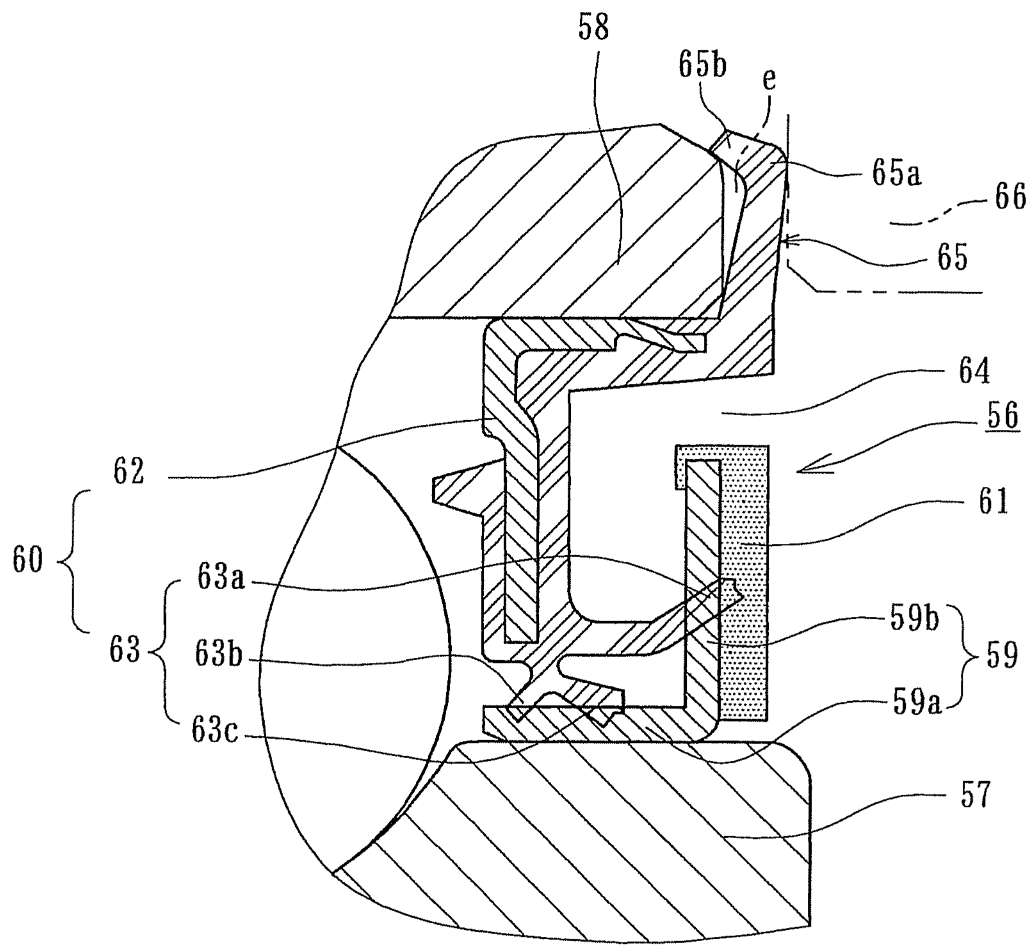
FIG. 9 is a partially enlarged view of a seal portion of another prior art wheel bearing apparatus of the prior art.

FIG. 1 is a longitudinal section view of one preferred embodiment of the vehicle wheel bearing apparatus. FIG. 2 is a partially enlarged view of the seal of FIG. 1. FIG. 3(*a*) is a partially enlarged view of only a sealing plate of FIG. 2. FIG. 3(*b*) is a partially enlarged view of a seal unit of FIG. 2. FIG. 3(*c*) is a partially enlarged view of FIG. 3(*b*). FIG. 4(*a*) is an explanatory view of a condition during assembly of the wheel bearing apparatus to a knuckle. FIG. 4(*b*) is an explanatory view of a condition after assembly of the wheel bearing apparatus to a knuckle. FIG. 5 is an explanatory view of a stacked condition of the seals. FIG. 6 is a longitudinal section view of a modification of the seal of FIG. 2. FIG. 7(*a*) is a longitudinal section view of another modification of the seal of FIG. 2. FIG. 7(*b*) is a partially enlarged view of the seal of FIG. 7(*a*). In the description below, the term "outer-side" defines a side that is positioned outside of a vehicle body (left-hand side in figures) and the term "inner-side" defines a side that is positioned inside of the vehicle body (right-hand side in figures) when the bearing apparatus is mounted on a vehicle body.

The wheel bearing apparatus of the present disclosure is a so-called "third generation" type for a driving wheel. It has an inner member 1, an outer member 2, and double row rolling elements (balls) 7, 7. The inner member 1 has a wheel hub 2 and an inner ring 3 press-fit onto the wheel hub 4 via a predetermined interference.

The wheel hub 2 is integrally formed, on its outer-side end, with a wheel mounting flange 4 to mount a wheel (not shown). The wheel hub outer circumference has one (outer-side) inner raceway surface 2*a*. A cylindrical portion 2*b* axially extends from the inner raceway surface 2*a*. The wheel hub 2 is also formed, on its inner circumference, with a serration (or spline) 2*c* for torque transmission. Hub bolts 5 are circumferentially equidistantly positioned and secured onto the wheel mounting flange 4. The inner ring 3 is formed, on its outer circumference, with the other (inner-side) inner raceway surface 3*a*. The inner ring 3 is press-fit onto the cylindrical portion 2*b* of the wheel hub 2, via a predetermined interference.

The wheel hub 2 is formed of medium-high carbon steel such as S53C including carbon of 0.40~0.80% by weight. It is hardened by high frequency induction hardening to have a surface hardness of 58~64 HRC over the inner raceway surface 2*a* and a region from an inner-side base of the wheel mounting flange 4 to the cylindrical portion 2*b*. The inner ring 3 and rolling elements 7 are formed of high carbon chrome steel such as SUJ2. They are dip hardened to their cores to have a hardness of 58~64 HRC.

The outer member 10 is formed, on its outer circumference, with a body mounting flange 10*b* to be mounted on a knuckle K. The outer member inner circumference has double row outer raceway surfaces 10*a*, 10*a* that oppose the inner raceway surfaces 2*a*, 3*a* of the inner member 1. The double row rolling elements 7, 7 are rollably contained in an annular space between the inner raceway surfaces 2*a*, 3*a* and the outer raceway surfaces 10*a*, 10*a*.

Seals 8, 9 are mounted in annular openings formed between the outer member 10 and inner member 1 at both their ends. The seals 8, 9 close and seal the annular openings in order to prevent leakage of lubricating grease contained in the bearing and entry of rain water or dust from the outside into the bearing.

The inner-side seal 9 of the seals 8, 9 comprises a slinger 11 and a sealing plate 12 oppositely arranged to each other, as shown in the enlarged view of FIG. 2. This forms a so-called "pack seal". The slinger 11 is press-formed of a ferromagnetic steel plate such as a ferritic stainless steel sheet (JIS SUS 430 etc.) or preserved cold rolled steel sheet (JIS SPCC etc.). It has a substantially L-shaped longitudinal section. It includes a cylindrical portion 11*a* and a standing portion 11*b*. The cylindrical portion is press-fit onto the inner ring 3. The standing portion 11*b* extends radially outward from the cylindrical portion 11*a*.

A magnetic encoder 15 is formed from an elastomer, such as rubber, with mingled magnetic powder, such as ferrite. The magnetic encoder 15 is integrally adhered, via vulcanizing adhesion, onto the inner-side surface of the standing portion 11*b* of the slinger 11. The magnetic encoder 15 is magnetized with N and S poles that are alternately arranged along its circumference and formed as a rotary encoder for detecting rotary speed of a wheel.

The sealing plate 12 includes a metal core 13 and a sealing member 14, vulcanizing adhered to the metal core 13. The metal core 13 includes a cylindrical portion 13*a* and a standing portion 13*b*. The cylindrical portion 13*a* is press-fit into the end of the outer member 10. The standing portion 13*b* extends radially inward from one end of the cylindrical portion 13*a*. The metal core 13 is press-formed from austenitic stainless steel sheet (JIS SUS304 etc.) or preserved cold rolled steel sheet to have a substantially L-shaped longitudinal section.

The sealing member 14 is formed of synthetic rubber such as NBR (acrylonitrile-butadiene rubber). The sealing member 14 includes a pair of side lips 14*a*, 14*b* and a grease lip 14*c*. The side lips 14*a*, 14*b* angularly extend radially outward. The grease lip 14*c* angularly extends toward the inside of the bearing. The side lips 14*a*, 14*b* are in sliding contact with the outer-side surface of the standing portion 11*b* of the slinger 11, via a predetermined axial interference. The grease lip 14*c* is in sliding contact with the cylindrical portion 11*a* of the slinger 11. The outer circumference of the magnetic encoder 15 opposes the sealing plate 12, via a predetermined radial gap to form a labyrinth seal 16. The labyrinth seal 16 prevents rain water or dust from flowing directly onto the side lip 14*a* and improves the sealability. There are other examples of materials of the sealing member 12 such as NBR, e.g. HNBR (hydrogenation acrylonitric-butadiene rubber), EPDM (ethylene propylene rubber), ACM (poly-acrylic rubber), superior in heat and chemical resistance, FKM (fluororubber) or silicone rubber.

Although the wheel bearing apparatus is shown formed with a double row angular contact ball bearing, using balls as the rolling elements 7, it is understood that the present disclosure is not limited to such a bearing and may include a double row tapered roller bearing, using tapered rollers as rolling elements. In addition, although shown as a third generation type, where the inner raceway surface 2*a* is directly formed on the wheel hub 2, the present application can be applied to the first and second generation types, where a pair of inner rings are press-fit onto a cylindrical portion of a wheel hub, or the fourth generation type.

According to the present disclosure, the sealing member 14 is secured to the metal core 13 while extending over the outer circumference of the end of the metal core 13. Thus, the sealing member 14 can be in close contact with the fitting portion of the outer member 10. In addition, the sealing member 14 is formed with an outer circumferential lip 17 that extends radially outward from the circumferential end of the sealing member 14. The outer circumferential lip 17 has a substantially L-shaped longitudinal section. The outer circumferential lip 17 is adapted to fit in a gap "e" between the inner-side end of the outer member 10 and a flange portion 18 of the knuckle K. Oil material such as grease or preservative oil is previously applied onto the outer circumferential lip 17. This makes it possible to improve the sealability of the seal 9.

As shown in FIG. 4(*a*), a diameter D1 of the lip apex 17*a*, of the outer circumferential lip 17, is set at a predetermined value so that the lip apex 17*a* contacts the flange 18 of the knuckle K within a margin area "δ" for contact under a condition where a predetermined axial gap "e0" exists between the tip end portion 17*b*, of the outer circumferential lip 17, and the end face of the outer member 10 during assembly of the wheel bearing apparatus onto the knuckle K. That is, the diameter D1 of the lip apex 17*a* of the outer circumferential lip 17 is set larger than a diameter D2 of an inner chamfered portion 18*a* of the flange 18 of the knuckle K by an amount ϕ0.1 mm or more. This makes it possible, as shown in FIG. 4(*b*), that the tip end portion 17*b* and the lip apex 17*a* of the outer circumferential lip 17 are elastically contacted, via predetermined interferences, with two points (i.e. respectively with the end face of the outer member 10 and a flange 18 of the knuckle K) after assembly of the wheel bearing apparatus onto the knuckle K. Thus, it is possible to surely prevent bulging out of the outer circumferential lip 17 from the knuckle K.

In addition, it is believed that the tip end portion 17*b* of the outer circumferential lip 17 would be turned over radially inward without being spread radially outward when the tip end portion 17*b* contacts the end face of the outer member 10 at an angle near 90°, as shown in FIG. 3(*b*). Thus, the inventors of this application have noticed a bent angle θ (FIG. 3(*a*)) of the tip end portion 17*b* of the outer circumferential lip 17. They found that the tip end portion 17*b* can be surely spread radially outward during assembly of the wheel bearing apparatus to the knuckle K when the bent angle θ is set at an angle 10° or more, and preferably 15° or more relative to a line normal to the end face of the outer member 10. This makes it possible that the tip end portion 17*b* and the lip apex 17*a* of the outer circumferential lip 17 are elastically contacted, via appropriate interferences, with two points, respectively, with the end face of the outer member 10 and a flange 18 of the knuckle K, after assembly of the wheel bearing apparatus to the knuckle K. Accordingly, it is possible to ensure sealing properties for a long term as well as to improve muddy water resistance. Also, it is possible to prevent entry of muddy water into the gap between the outer member 10 and the knuckle K by preventing the outer circumferential lip 17 from being damaged. Further, it is possible to prevent the generation of corrosion by improving the sealability between the outer member 10 and knuckle K.

Furthermore according to the present disclosure, as shown in FIG. 3(*a*), an inclined angle α of the outer circumferential lip 17 and inclined angles β, γ of the pair of side lips 14*a*, 14*b* relative to the axis of the bearing are substantially identical under a condition before setting of the sealing plate 12 on the slinger 11. This makes it possible to improve the drafting ability during molding of the sealing member. FIG. 3(*b*) shows a condition where the sealing plate 12 is set on the slinger 11. Under this condition, since the side lips 14*a*, 14*b* contact the slinger 11, via respective interferences, the inclined angles β, γ of the side lips 14*a*, 14*b* are varied to angles β', γ', respectively. According to the present disclosure, the radially outer-side side lip 14*a* of the side lips 14*a*, 14*b* is arranged so that a gap remains relative to the outermost circumference of the radially inner-side lip 14*b* even if the radially outer-side lip 14*a* has been worn out and there is no interference relative to the standing portion 11*b* of the slinger 11. That is, the gap is set so that it remains even under a condition where a distance "C" between side lips 14*a*, 14*b* is minimized (C>0). Thus, the radially inner-side lip 14*b* is not contacted by the radially outer-side lip 14*a*. Accordingly, the inner side lip 14*b* can maintain a desirable sliding contact condition relative to the standing portion 11*b* of the slinger 11. Thus, the resistance against muddy water of the seal 9 exists for a long term.

As shown in FIG. 3(*b*), height H of seal longitudinal section is set from the inner circumference of the slinger 11 to the outer circumference of the sealing plate 12 and is 6~8 mm. A ratio H/B, of the height H to a width B of the seal 9 including the magnetic encoder 15, is set within a range of 1.2~1.8. As previously described, since the gap of the pair of side lips 14*a*, 14*b* can remain even under a condition where a distance "C" between them is minimized, it is possible to maintain the muddy water resistance as well as to reduce the seal section height H to a minimum. In this case, if the ratio H/B is less than 1.2, it would be difficult to have a necessary seal section height H, a height of 6 mm or more. On the contrary, if the ratio H/B exceeds 1.8, the seal width B would be too small to have sufficient muddy water resistance.

As shown in FIG. 3(*c*), a flat face portion 17*c* is formed on the outer circumferential lip 17 at the base. The height L of the flat face portion 17*c* is set at 1.35 mm or more. This improves the workability during press-fitting and prevents the outer circumferential lip 17 from being damaged during the press-fitting operation.

According to the present disclosure, the sealing member 14 of the seal 9 is formed from rubber material having a compression set of physical properties of rubber of 40% or less at 120° C.×70 hours and a TR 10 value (elongation percentage: 50%) at −35° C. or less. This makes it possible to obtain preferable strain recovering ability even in a low temperature region and thus keeps a desirable sealing performance. The TR 10 value means a temperature at which 10% recovery of previously applied strain of material is attained. A value near the TR 10 value has been empirically used as the low temperature limit value.

In addition, as shown in FIG. 5, the sealing member 12 is integrally formed with a tongue 19. The tongue 19 axially extends from the side surface of the radially inner portion of the standing portion 13*b* of the metal core 13 to the outer-side direction. The amount W1 of the projection of the tongue 19 is set so that a gap W2, between the metal core 13 and the outer circumferential lip 17, becomes W2>0. This prevents the outer circumferential lip 17 from contacting with the metal core 13 when the seals 9 are stacked upon each other in an assembling line of the wheel bearing. Thus, this prevents the sealing lip from being damaged. In addition, if a magnetic encoder 15 contacts an adjacent metal core 13, the magnetic encoder 15 would be closely adhered to the metal core 13.

Thus, seals 12 could not be easily separated from each other. The provision of the tongue 19 solves such a problem and improves the workability during assembly of the seal 9 onto the wheel bearing.

FIG. 6 shows a modification of the seal 9 described above. This seal 20 is only partially different from the seal 9. Accordingly, the same reference numerals are used to designate the same structural elements of the previous embodiment and detailed descriptions of them will be omitted.

The seal 20 includes the annular slinger 11 and an annular sealing plate 21 arranged opposite to each other. The sealing plate 21 includes the metal core 13 and a sealing member 22 adhered to the metal core 13, via vulcanizing adhesion. The sealing member 22 is formed from synthetic rubber such as NBR etc. The sealing member 22 includes the pair of side lips 14*a*, 14*b* that angularly extend radially outward. It includes the grease lip 14*c* that angularly extends toward the inside of the wheel bearing. An auxiliary lip 22*a* angularly extends radially outward at a position radially outside of the side lips 14*a*, 14*b*. The auxiliary lip 22*a* is arranged opposite to the outer-side surface of the standing portion 11*b* of the slinger 11, via a predetermined axial gap. The auxiliary lip 22*a* prevents the side lip 14*a* from being directly exposed to muddy water that would enter into the seal from outside. Thus, this improves both the muddy water resistance and the durability of the seal 20.

FIG. 7(*a*) shows another modification of the seal 9 described above. The seal 23 includes the annular slinger 11 and the sealing plate 12. Similar to the embodiment described above, a magnetic encoder 24 is integrally adhered, via vulcanizing adhesion, onto the inner-side surface of the standing portion 11*b* of the slinger 11. The magnetic encoder 24 is formed from an elastomer, such as rubber, with mingled magnetic powder, such as ferrite. The encoder 24 is magnetized with N and S poles that are alternately arranged along its circumference and formed as a rotary encoder to detect rotary speed of a wheel.

The magnetic encoder 24 is integrally formed, on its outer circumference, with a shielding lip 24*a* that extends angularly radially outward. As shown in FIG. 7(*b*), the shielding lip 24*a* opposes the base of the outer circumferential lip 17, via slight contact or a slight labyrinth gap. Grease (shown by cross-hatchings) is previously applied to the shielding lip 24*a*. This prevents muddy water from entering into the seal 23 from the outside. Also, this prevents a large increase of torque load even when the shielding lip 24*a* contacts the sealing member 14.

The present disclosure can be applied to wheel bearing apparatus of the first through fourth generations irrespective of a driving wheel or for driven wheel.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A vehicle wheel bearing apparatus comprising:

an outer member to be fit into a knuckle, forming a vehicle suspension apparatus, the outer member inner circumference including double row outer raceway surfaces;

an inner member formed, on its outer circumference, with inner raceway surfaces that oppose, respectively, one of the double row outer raceway surfaces;

double row rolling elements are freely rollably contained between the inner raceway surfaces and the outer raceway surfaces of the inner member and the outer member;

seals are mounted within annular openings formed between the outer member and the inner member;

the inner-side seal of the seals comprises an annular slinger and a sealing plate, the annular slinger comprising a cylindrical portion and a standing portion, the cylindrical portion is press-fit onto the inner member and the standing portion extends radially outward from the cylindrical portion, the sealing plate comprises a metal core and a sealing member, the metal core is press-fit into the inner circumference of an end of the outer member, the sealing member integrally adhered to the metal core, via vulcanizing adhesion, the sealing member has a pair of side lips angularly extending radially outward, the sealing member is adapted to be in sliding contact with the standing portion of the slinger, via a predetermined axial interface;

the sealing member is secured to the metal core while extending over the outer circumference of the end of the metal core; and the sealing member is formed with an outer circumferential lip that extends radially outward from its circumferential end, the outer circumferential lip has a substantially L-shaped longitudinal section and is adapted to fit in a gap between the inner-side end of the outer member and a flange portion of the knuckle such that a tip end portion of the outer circumferential lip and a lip apex of the outer circumferential lip elastically contact, via predetermined interferences after assembly of the wheel bearing apparatus onto the knuckle, with two points, respectively, an outer circumference of the outer member and a flange of the knuckle, to surely prevent bulging out of the outer circumferential lip from the knuckle such that a tip end portion of the outer circumferential lip rest on an outer circumference of the outer member.

2. The vehicle wheel bearing apparatus of claim 1, wherein the radially outer-side side lip of the side lips is arranged so that a gap remains relative to the outermost circumference of the radially inner-side lip even if the radially outer-side lip becomes worn out and there is no interference relative to the standing portion of the slinger.

3. The vehicle wheel bearing apparatus of claim 1, wherein the sealing member is further formed with a grease lip that angularly extends toward the inside of the bearing at a position radially inside of the side lips.

4. The vehicle wheel bearing apparatus of claim 1, wherein the sealing member is integrally formed with a tongue axially extending from the side surface of the metal core to an outer-side direction.

5. The vehicle wheel bearing apparatus of claim 1, wherein the sealing member is further formed with an auxiliary lip positioned radially outside of the side lips and that angularly extends radially outward and the auxiliary lip is arranged opposite to the outer-side surface of the standing portion of the slinger via a predetermined axial gap.

6. The vehicle wheel bearing apparatus of claim 1, wherein a bent angle (θ) of the tip end portion of the outer circumferential lip is 10° or more relative to a line normal to the end face of the outer member.

7. The vehicle wheel bearing apparatus of claim 1, wherein a flat face portion is formed on the outer circumferential lip at a base, and a height of the flat face portion is 1.35 mm or more.

8. The vehicle wheel bearing apparatus of claim 6, wherein oil material is previously applied on the outer circumferential lip, and the lip apex contacts the flange of the knuckle within a margin area (δ) for contact.

9. The vehicle wheel bearing apparatus of claim 1, wherein a magnetic encoder is formed from an elastomer with mingled magnetic powder and N and S poles are alternately arranged along its circumference, the magnetic encoder is integrally adhered, via vulcanizing adhesion, onto the inner-side surface of the standing portion of the slinger, and the magnetic encoder is integrally formed on its outer circumference with a shielding lip that extends angularly radially outward and the shielding lip opposes the base of the outer circumferential lip via slight contact or a slight labyrinth gap.

10. The vehicle wheel bearing apparatus of claim 9, wherein grease is previously applied to the shielding lip.

11. The vehicle wheel bearing apparatus of claim 1, wherein a ratio H/B of a height H of a seal longitudinal section from the inner circumference of the slinger to the outer circumference of the sealing plate to a width B of the seal is set within a range of 1.2~1.8.

12. The vehicle wheel bearing apparatus of claim 1, wherein the sealing member is formed of rubber material having a compression set of physical properties of rubber of 40% or less at 120° C.×70 hours and a TR 10 value of −35° C. or less.

13. A vehicle wheel bearing apparatus comprising:

an outer member to be fit into a knuckle, forming a vehicle suspension apparatus, the outer member inner circumference including double row outer raceway surfaces;

an inner member formed, on its outer circumference, with inner raceway surfaces that oppose, respectively, one of the double row outer raceway surfaces;

double row rolling elements are freely rollably contained between the inner raceway surfaces and the outer raceway surfaces of the inner member and the outer member;

seals are mounted within annular openings formed between the outer member and the inner member;

the inner-side seal of the seals comprises an annular slinger and a sealing plate, the annular slinger comprising a cylindrical portion and a standing portion, the cylindrical portion is press-fit onto the inner member and the standing portion extends radially outward from the cylindrical portion, the sealing plate comprises a metal core and a sealing member, the metal core is press-fit into the inner circumference of an end of the outer member, the sealing member integrally adhered to the metal core, via vulcanizing adhesion, the sealing member has a pair of side lips angularly extending radially outward, the sealing member is adapted to be in sliding contact with the standing portion of the slinger, via a predetermined axial interface;

the sealing member is secured to the metal core while extending over the outer circumference of the end of the metal core;

the sealing member is formed with an outer circumferential lip that extends radially outward from its circumferential end, the outer circumferential lip has a substantially L-shaped longitudinal section and is adapted to fit in a gap between the inner-side end of the outer member and a flange portion of the knuckle; and the sealing member is further formed with an auxiliary lip positioned radially outside of the side lips and that angularly extends radially outward and the auxiliary lip is arranged opposite to the outer-side surface of the standing portion of the slinger via a predetermined axial gap.

14. A vehicle wheel bearing apparatus comprising:

an outer member to be fit into a knuckle, forming a vehicle suspension apparatus, the outer member inner circumference including double row outer raceway surfaces;

an inner member formed, on its outer circumference, with inner raceway surfaces that oppose, respectively, one of the double row outer raceway surfaces;

double row rolling elements are freely rollably contained between the inner raceway surfaces and the outer raceway surfaces of the inner member and the outer member;

seals are mounted within annular openings formed between the outer member and the inner member;

the inner-side seal of the seals comprises an annular slinger and a sealing plate, the annular slinger comprising a cylindrical portion and a standing portion, the cylindrical portion is press-fit onto the inner member and the standing portion extends radially outward from the cylindrical portion, the sealing plate comprises a metal core and a sealing member, the metal core is press-fit into the inner circumference of an end of the outer member, the sealing member integrally adhered to the metal core, via vulcanizing adhesion, the sealing member has a pair of side lips angularly extending radially outward, the sealing member is adapted to be in sliding contact with the standing portion of the slinger, via a predetermined axial interface;

the sealing member is secured to the metal core while extending over the outer circumference of the end of the metal core;

the sealing member is formed with an outer circumferential lip that extends radially outward from its circumferential end, the outer circumferential lip has a substantially L-shaped longitudinal section and is adapted to fit in a gap between the inner-side end of the outer member and a flange portion of the knuckle; and a magnetic encoder is formed from an elastomer with mingled magnetic powder and N and S poles are alternately arranged along its circumference, the magnetic encoder is integrally adhered, via vulcanizing adhesion, onto the inner-side surface of the standing portion of the slinger, and the magnetic encoder is integrally formed on its outer circumference with a shielding lip that extends angularly radially outward and the shielding lip opposes the base of the outer circumferential lip via slight contact or a slight labyrinth gap.

* * * * *